Feb. 4, 1958 J. D. BIBBS 2,822,187
SAFETY CRASH PAD FOR VEHICLES
Filed Sept. 1, 1955 4 Sheets-Sheet 1

INVENTOR.
John D. Bibbs
BY
Hyde, Meyer, Baldwin & Doran
ATTORNEYS

INVENTOR.
John D. Bibbs

INVENTOR.
John D. Bibbs
BY
Hyde, Meyer, Baldwin & Doran
ATTORNEYS

Feb. 4, 1958 J. D. BIBBS 2,822,187
SAFETY CRASH PAD FOR VEHICLES
Filed Sept. 1, 1955 4 Sheets-Sheet 4

INVENTOR.
John D. Bibbs
BY
Hyde, Meyer, Baldwin & Doran
ATTORNEYS

United States Patent Office 2,822,187
Patented Feb. 4, 1958

2,822,187

SAFETY CRASH PAD FOR VEHICLES

John D. Bibbs, Lakewood, Ohio

Application September 1, 1955, Serial No. 531,970

7 Claims. (Cl. 280—150)

This invention relates to crash pads and more particularly to crash pads which may be detachably secured to the instrument panel of substantially all types of vehicles.

An object of this invention is to provide a new and improved crash pad for vehicle instrument panels which will protect the persons riding in the vehicle from severe facial or other bodily injury upon a sudden stop of the vehicle.

Another object of this invention is to provide a new and improved crash pad which may be installed upon the instrument panel of a vehicle without modifying or altering the existing structure of the panel.

A further object of this invention is to provide an improved crash pad having a pivotally mounted flap portion which is adapted to swing upwardly in front of the windshield upon sudden deceleration of the vehicle and thereby protect the head, face and other portions of the passenger's body from injury.

Still another object of this invention is to provide a novel crash pad having extra heavy padding in the zones where it is most needed, and one which may be readily rolled or folded downwardly upon itself so that the crash pad may be easily disposed out of the way and not interfere with the normal operation of the vehicle or movement of the passengers therein.

Another object of the present invention is to provide a novel crash pad characterized by its structural simplicity, the ease of assembly of its parts, its strong and sturdy nature and its low manufacturing cost.

Other features of this invention reside in the arrangement and design of the parts for carrying out their appropriate functions.

Further objects of this invention, and certain of its practical advantages will be referred to in or will be evident from the following description of two embodiments of the invention, as illustrated in the accompanying drawings, in which.

Before describing in detail the herein embodiments of the invention, it is to be understood that the present invention is not limited to the structural details or the particular arrangement of parts herein shown, as devices embodying the present invention may take other forms. It also is to be understood that the phraseology and terminology herein used are for purposes of description and not of limitation as the scope of the present invention is denoted by the appended claims.

Figure 4:
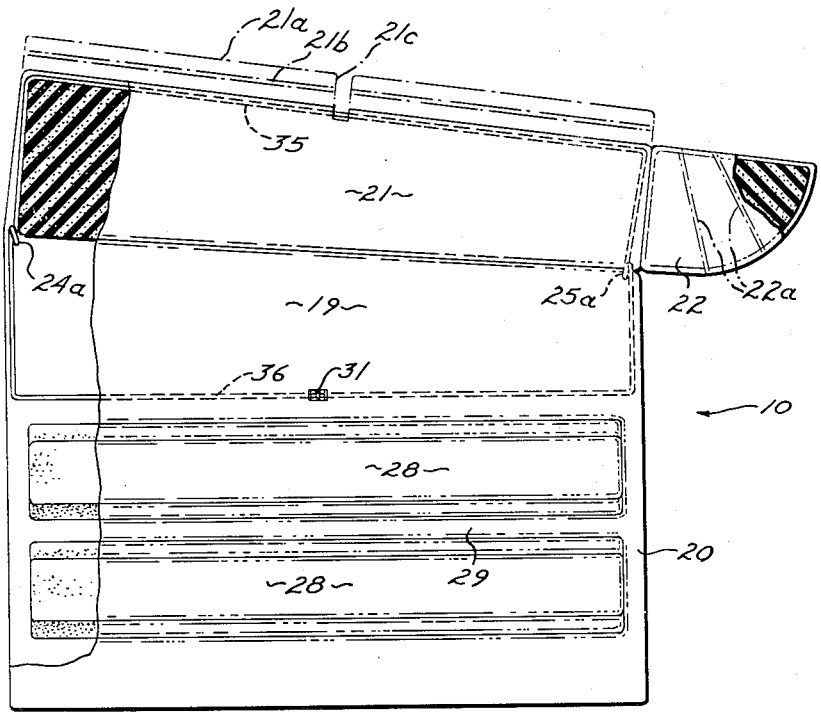
Fig. 4 is a top plan view showing the full lay-out and development of the crash pad.
Figure 5:
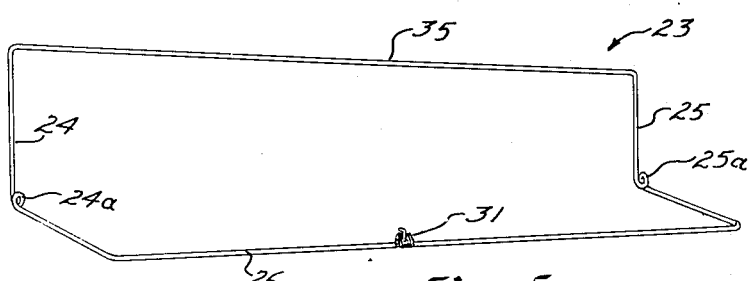
Fig. 5 is a perspective view of the frame member which supports the upper or cap portion of the crash pad.
Figure 6:
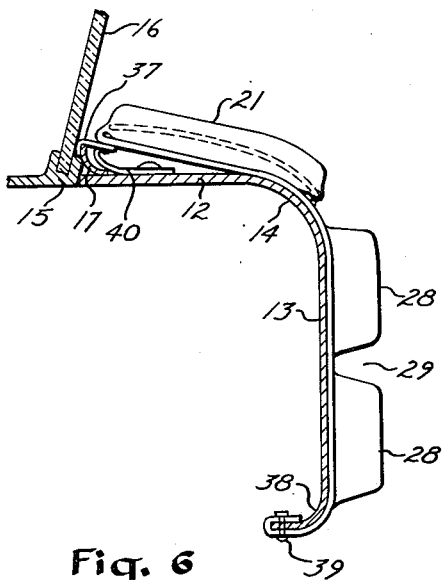
Fig. 6 is a vertical sectional view taken through the windshield and instrument panel showing one possible manner of attaching the crash pad to the panel.
Figure 7:
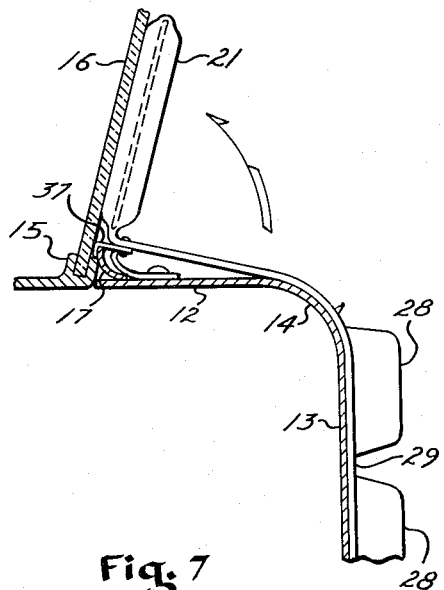
Fig. 7 is a vertical cross sectional view similar to Fig. 6, but showing the pivotally mounted flap portion in an upright or raised position with its outermost face bearing against the windshield.

Referring now to the accompanying drawings and particularly to that embodiment of the invention illustrated in Figs. 1 through 12, the improved safety crash pad 10 has the form of a protective or cushioning cover for an instrument panel 11 whose top shelf surface 12 merges with a front face surface 13 along a substantially rounded shoulder portion 14 as clearly seen in Figs. 6 to 9. The top ledge surface of the instrument panel is secured to a sash or glass seating molding 15 of the windshield 16. As seen in Figs. 6 and 7, a strip of decorative trim 17 is usually provided to cover the joint of the sash and top ledge surface. It will be noted that a small space is usually provided between the upper edge of the trim strip 17 and the inner surface of the windshield 16.

The crash pad 10 is particularly designed to cover the instrument panel in front of the guest passenger seat but not necessarily limited to this location. The pad is positioned so as to protect the guest passenger if he should be thrown forward due to a sudden deceleration of the vehicle. As here illustrated in Fig. 4, the crash pad 10 consists of three main portions, namely, a cap portion 19 which is adapted to overlie the top ledge surface 12 of the instrument panel, a depending apron portion 20 adapted to overlie and cushion the front face surface 13 of the instrument panel and a flap portion 21 which is pivotally or hingedly secured to the upper end of the cap portion 19. The flap portion 21 may be and here is provided with a laterally extending wing 22 for the purpose of closely conforming to the curved windshields provided on many modern automobiles. The crash pad 10 includes a wire frame 23 (preferably constructed of spring steel) as seen in Fig. 5. The frame is generally rectangular in shape and has each of its side members 24 and 25 provided with a spring coil 24a and 25a respectively intermediate their ends so that the two halves of the frame may be bent over upon one another in a manner hereinafter described. As seen in Fig. 4, the frame is confined to the cap and flap portions 19 and 21 respectively of the crash pad and has its lower edge member 26 terminating substantially in the portion of the pad which overlies the rounded shoulder portion 14 of the instrument panel, as seen in Figs. 6 and 7. In the preferred form of my invention, the frame 23 is totally imbedded within the periphery of the crash pad. Since the frame 23 is made of wire, it may be readily bent to enable the crash pad to be shaped to closely conform to the contour of the instrument panel over which it is adapted to lie. In order to further permit the crash pad to conform to the contour of the instrument panel and avoid an uncomely and bulging misfit which was an inherent shortcoming of most safety crash pads in the past, due to their bulky cushioning construction; I have provided a pad with a plurality of spaced, elongated, thickly padded sections 28. The sections 28 extend substantially parallel to the length of the instrument panel and are contained mainly on the depending apron portions 20 of the crash pad. The padded portions 28 are provided with a resilient substance such as sponge rubber or the like and are constructed of sufficient thickness to protectively absorb any shock or violent impact of a passenger's head or face. The material used for such padding should be soft yet firm enough not to mushroom or bottom out and capable of efficiently absorbing the energy of the impact without transmitting the shock load back to the striking object.

A suitable cover or envelope made of any suitable smooth, flexible, strong fabric such as vinyl plastic or lightweight canvas, is provided to enclose and contain the various parts of the crash pad in their respective positions. The spaces 29 provided between the thickly padded sections 28 are either void of, or contain a thin layer of sponge rubber and thereby form a hinge between the adjacent sections 28 and permit such padded sections to be folded one upon the other and also to more closely conform to the contour of the particular instrument panel to be covered. The spaces 29 between the padded sections 28 are never so great as to permit any portion of the human head to enter therein without first engaging the padded sections 28. The cap portion 19 of the crash pad is provided with a relatively thin thickness of padding since it is extremely improbable and unlikely that this portion is ever struck during sudden deceleration.

Figure 1:
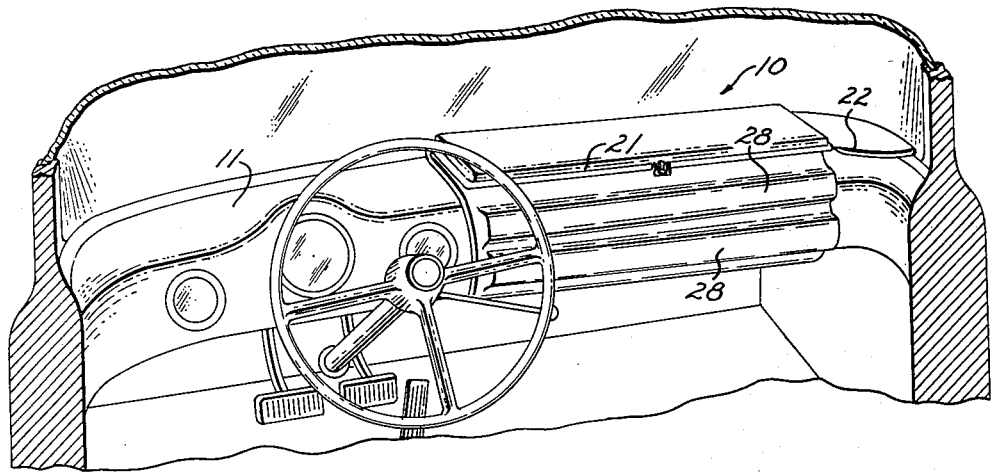
Fig. 1 is a perspective view looking forward into the interior of an automobile showing my novel crash pad, as constructed in accordance with one embodiment of the invention, as improvements, installed on the instrument panel.
Figure 2:
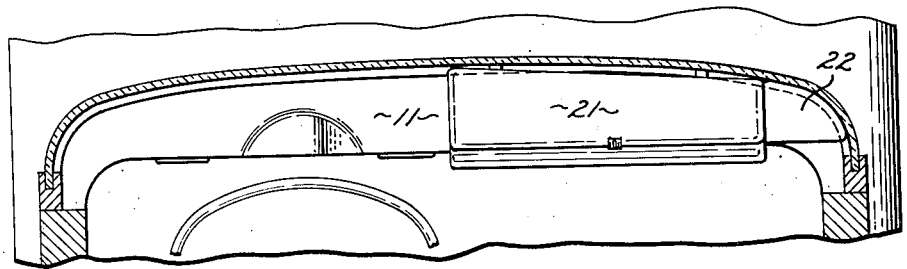
Fig. 2 is a view looking downwardly upon the instrument panel having my novel crash pad installed thereon.
Figure 3:
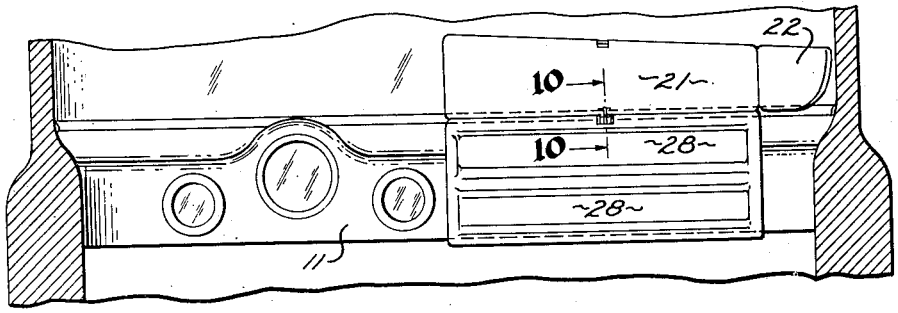
Fig. 3 is a front elevational view of the instrument panel having my novel crash pad installed thereon and showing the pivoted flap portion in a raised position in front of the windshield.

The flap portion 21 and wing portion 22 are both provided with relatively thick padding since they are much more likely to be struck by a passenger being thrown forward due to sudden deceleration of the vehicle. The flap 21 may be and preferably is provided with a padded extension portion 21a shown in dotted lines in Fig. 4, which is in turn provided with a seam or seams 21b containing little or no padding and permitting trimming of the flap 21 to any desired length. In a preferred construction the wing portion 22 is provided with a plurality of spaced seams 22a between the padded sections. The seams 22a permit the wing 22 to be easily trimmed to accommodate the curved contour of the windshields of many modern automobiles. As seen in Figs. 1, 2 and 6, the flap portion 21 is doubled over and securely held in a position contiguous to the cap portion 19 by latch means 31. The hinge members 24a and 25a are constructed to normally urge the flap portion 21 to an upright position, as seen in Fig. 7, upon the release of the aforesaid latch means.

Figure 10:
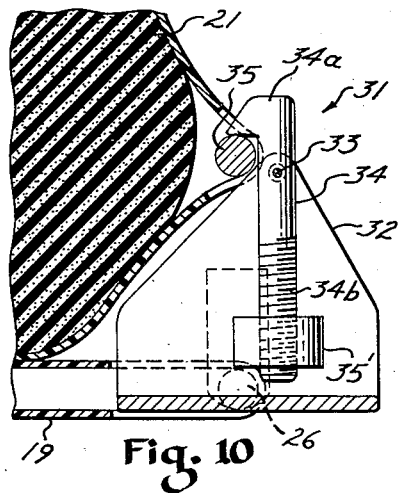
Fig. 10 is an enlarged fragmentary detail view taken along the plane of line 10—10 of Fig. 3 showing the novel fastening means used to hold the flap portion in a down position, in contact with the cap portion of the crash pad, during normal operation of the vehicle.
Figure 11:
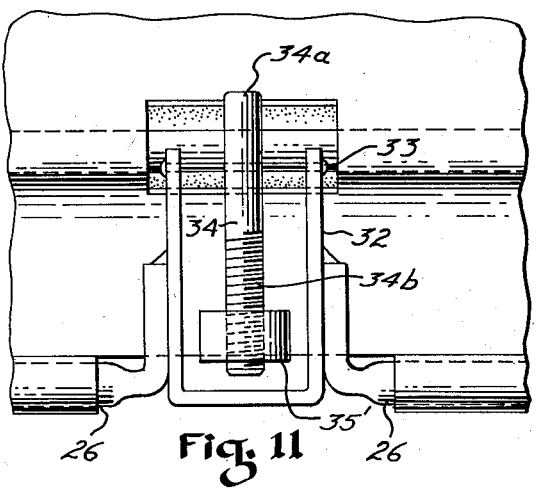
Figs. 11 and 12 are views similar to Fig. 10 and show additional details of the fastening means.
Figure 12:
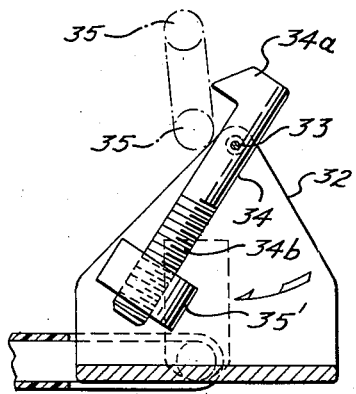

The novel safety latch means 31 are shown in Figs. 10 through 12 and consist of a U-shaped bracket 32 which is secured to the lower frame member 26 by welding or other suitable means. A pin 33 extends transversely across the space between the upstanding arms of the U-shaped bracket 32 adjacent their upper ends. A latch member 34 having a hook portion 34a at its upper end and a threaded lower stem portion 34b containing an adjustably secured counter-weight 35' thereon, is pivotally mounted on the pin 33. The hook portion 34a is adapted to engage the end member 35 through a suitable slot in the cover material, when the flap 21 is folded down into the position shown in Fig. 6.

It will be readily appreciated that when a sudden deceleration of the vehicle occurs the weight 35 will tend to continue its forward motion, despite the fact that the forward motion of the vehicle has stopped or been greatly reduced. As a result, the weight 35' will shift to the left as viewed in Fig. 10, to a position as shown in Fig. 12, and thus will cause the hook portion 34a to move out of engagement with the frame member 35, and permit the coil springs 24a and 25a to normally urge the flap member 23 into an upright position and adjacent the windshield 16 as seen in Fig. 7. I do not intend to limit myself to this particular safety latch since it is probable that there are other types which would work satisfactorily. However, I have found that this particular safety latch is extremely effective and capable of precise adjustment through the adjustable weight 35' which may be raised and lowered by means of threads 34b along the shaft 34.

The fastening means between the crash pad and the upper end of the instrument panel comprises a pair of metal members 37, one end of which is bent to form a hook which is adapted to extend downwardly into the space between the trim strip 17 and the windshield 16 or into a defroster slot which is provided in most modern automobiles, and thereby hold the pad in position upon the instrument panel. It will be seen that the metal members 37 are fastened to the crash pad substantially at the zone of the spring coils 24a and 25a and project forwardly a sufficient amount to allow space for the flap portion 21 to freely pivot into an upright position, as shown in Fig. 7.

Figure 8:
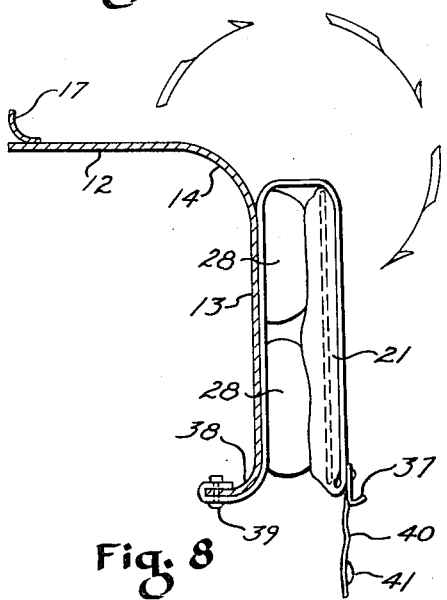
Fig. 8 is an enlarged sectional view similar to Fig. 6, but showing the crash pad in an intermediate stage of being rolled downwardly upon itself.
Figure 9:
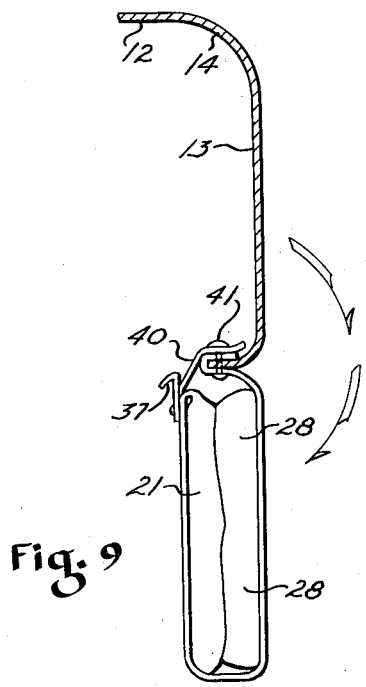
Fig. 9 is an enlarged detailed view similar to Fig. 8 but showing the final stage of the folding operation wherein the folded crash pad depends from the bottom of the instrument panel in such a manner as not to interfere with the normal operation of the vehicle.

The lower end of the crash pad is secured to the bottom edge of the instrument panel which is usually provided with an inwardly turned portion 38 as indicated in Figs. 6 through 9. A small snap fastener 39 extends through the panel and the material of the crash pad, which at its lower end is very thin and contains little or no padding. Since the length of the front face portion 13 of the panel may vary for different instruments, sufficient material is provided at the bottom of the crash pad to accommodate any design. Any excess material may be cut off prior to installation. By releasing the hook members 37 the crash pad may be rolled clockwise upon itself through the successive steps as indicated in Figs. 6, 8 and 9 to the position wherein it depends freely from the bottom of the instrument panel, as seen in Fig. 9. A pair of straps 40 are provided, having eyelets 41 at their end portions which are adapted to engage the snap fastener 39 to retain the crash pad in the position shown in Fig. 9.

Thus, in a finally assembled position upon the instrument panel, as viewed in Fig. 1, the cap portion 19 of the crash pad 10 overlies the top shelf surface 12 of the panel and the depending apron portion 20 overlies and cushions the front face of surface 13 of the panel while the flap portion 21 and wing 22 are bent back upon the cap portion 19 during normal use. Upon sudden deceleration of the forward motion of the vehicle the safety latch member 31 is caused to release the flap portion 21 which immediately raises to an upright position by the action of coil springs 24a and 25a. The flap portion 21 together with the cap and depending apron portions of the crash pad define yielding surfaces against which a passenger may be thrust without incurring serious injuries.

Figure 13:
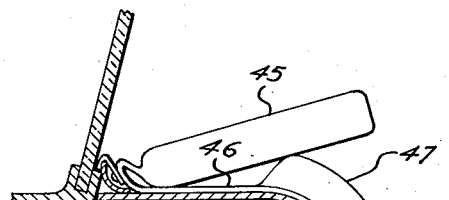
Fig. 13 is an enlarged vertical sectional view taken through the windshield and instrument panel and showing a second embodiment of the present invention.
Figure 14:
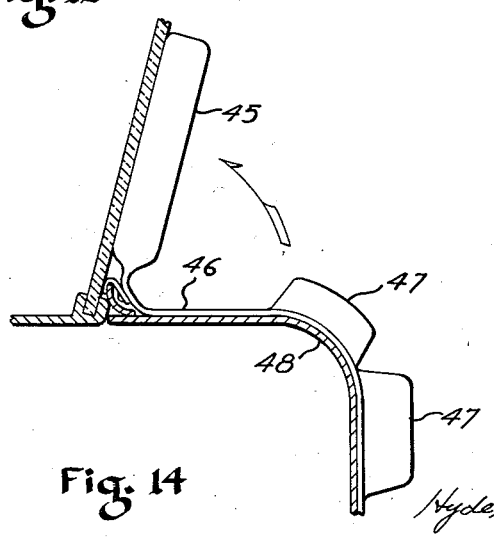
Fig. 14 is a view similar to Fig. 13 but showing the pivotal flap of the second embodiment in an upright or raised position adjacent the windshield.

In Figs. 13 and 14, I have shown a modified form of crash pad in which the pivoted flap member 45 depends entirely upon its own momentum or inertia to raise it into an upright position, or from the position shown in Fig. 13 to the position shown in Fig. 14. In this embodiment the frame member 23 of Fig. 5 is entirely eliminated and the flap portion 45 is merely pivotally secured or hinged to the cap portion 46 of the crash pad, by means of the cover or envelope material of the crash pad. As seen in Figs. 13 and 14 the thickly padded sections 47 extend upwardly to a position wherein they overlie the shoulder zone 48 of the instrument panel. The purpose of this particular construction is to provide a normal rest for the flap portion 45 wherein the flap portion assumes an angular disposition which is off center as seen in Fig. 13 and thereby assures that the flap portion will swing upward in a counterclockwise direction upon a sudden deceleration of the vehicle. The embodiment shown in Figs. 13 and 14 is simpler and somewhat easier to manufacture than that shown in Figs. 1 through 12; however, it is somewhat less positive in its action, since it is not spring biased. With the exception of the aforementioned features, the crash pad shown in Figs. 13 and 14 is identical in construction to that shown in Figs. 1 through 12.

It should now be apparent that I have provided a crash pad of the type described which is adaptable as an accessory to the instrument panel of most vehicles. My particular crash pad takes the form of one which may be quickly attached by a person unskilled in mechanics and one which may be easily removed from sight and stored in an unobstructive position.

In view of the foregoing description, taken in conjunction with the accompanying drawings, it is believed that a clear understanding of the construction, operation, and advantages of the here illustrated devices will be quite apparent to those skilled in this art.

Having thus described my invention and illustrated its use, what I claim is new and desire to secure by Letters Patent is:

1. A crash pad adapted to be supported on the instrument panel of a vehicle having a windshield, said pad having a cap portion, a depending apron portion and a flap portion overlying said cap portion, said flap portion being swingably mounted with respect to said cap portion, said pad comprising a plurality of spaced thickly padded sections, a covering forming hinge portions between said padded sections and retaining said padded sections together, said hinge portions being of such length as to permit folding said flap portion upon said padded sections, a frame member formed of relatively light weight material extending around portions of said pad, said frame enabling said pad to be shaped to approximately conform to the contour of said panel over which it is adapted to lie, means associated with said frame member to normally urge said flap into an upright position in front of said windshield, normally stationary means arranged to move in response to predetermined deceleration of said vehicle, a normally closed latch member operatively connected to said stationary means and retaining said flap portion in close contact with said cap portion, said latch member moving to an unlatched position on movement of said normally stationary means, whereby said flap is caused to pivot into an upright position in front of said windshield to prevent facial injury to the passengers, and means for holding said pad in position upon said panel.

2. A crash pad adapted to be supported on the instrument panel of a vehicle having a windshield, said pad having a cap portion overlying the top ledge surface of said panel and a depending apron portion overlying and cushioning the front face surface of said panel, a flap portion overlying said cap portion and swingably mounted with respect to said cap portion, said pad having a plurality of spaced thickly padded sections extending substantially parallel to the length of said panel, a cover forming hinge portions between said padded sections and retaining said padded sections together, a shapeable frame member formed of relatively light weight wire material extending peripherally around the cap and flap portions of said pad, said frame enabling said pad to be shaped to approximately conform to the contour of the panel over which it is adapted to lie, resilient means associated with said frame member to normally urge said flap into an upright position in front of said windshield, a normally closed latch means retaining said flap portion in close contact with said cap portion, said latch means moving to an unlatched position on sudden deceleration of said vehicle, whereby said resilient means cause said flap to pivot into an upright position in front of said windshield to prevent facial injury to the passengers.

3. A crash pad adapted to be supported on the instrument panel of a vehicle having a windshield, said pad having a cap portion overlying the top ledge surface of said panel and a depending apron portion overlying and cushioning the front face surface of said panel, a flap portion overlying said cap portion, said flap portion forming an integral continuation of said cap portion and being swingably mounted with respect to said cap portion, said pad having a plurality of spaced thickly padded sections extending substantially parallel to the length of said panel, a relatively thin pliable covering forming hinge portions between said padded sections and retaining said padded sections together, said hinge portions being of such length as to permit folding said flap portion upon said padded sections, a shapable frame member formed of relatively light weight spring wire material extending peripherally around the edge of said cap and flap portions of said pad, said frame being imbedded within said pad and enabling said pad to be shaped to approximately conform to the contour of the panel over which it is adapted to lie, spring means associated with said frame member to normally urge said flap into an upright position in front of said windshield, normally stationary means arranged to shift in position responsive to predetermined deceleration of said vehicle, a normally closed latch member operatively connected to said stationary means and retaining said flap portion in close contact with said cap portion, said latch member moving to an unlatched position on shifting of said normally stationary means, whereby said spring means cause said flap to pivot into an upright position in front of said windshield to prevent facial injury to the passengers, and means for holding said pad in position upon said panel.

4. A crash pad adapted to be supported on the instrument panel of a vehicle having a windshield, said pad comprising a relatively thin, pliable material, said pad having a cap portion overlying the top surface of said instrument panel and a depending apron portion normally overlying and cushioning the front face surface of said instrument panel, a flap portion overlying said cap portion, said flap portion being swingably mounted with respect to said cap portion and adapted upon sudden deceleration of said vehicle to swing into an upright position in front of said windshield to prevent facial injury to the passengers, a plurality of spaced thickly padded sections on said pad, said relatively thin pliable material forming hinge portions between adjacent padded sections and between said padded sections and said flap portion, said hinge portions being of such length as to permit folding of said flap and cap portions upon said thickly padded portions.

5. A crash pad adapted to be supported on the instrument panel of a vehicle having a windshield, said pad having a cap portion overlying the top ledge surface of said panel and a depending apron portion overlying and cushioning the front face surface of said panel, a flap portion overlying said cap portion, said flap portion being an integral continuation of said cap portion and swingably mounted with respect to said cap portion and adapted upon sudden deceleration of said vehicle to swing into an upright position in front of said windshield to prevent facial injury to the passengers, normally closed means retaining said flap portion in close contact with said cap portion, and said means moving to an open position on sudden deceleration of said vehicle, whereby said flap will pivot into an upright position in front of said windshield.

6. A crash pad adapted to be supported on the instrument panel of a vehicle having a windshield, said pad having a cap portion overlying the top ledge surface of said panel and a depending apron portion overlying and cushioning the front face surface of said panel, a flap portion overlying said cap portion, said flap portion being swingably mounted with respect to said cap portion and adapted upon sudden deceleration of said vehicle to swing into an upright position in front of said windshield to prevent facial injury to the passengers, a shapable frame member formed of relatively light weight spring wire material extending peripherally around the edge of said cap and flap portions of said pad, said frame being imbedded within said pad and enabling said pad to be shaped to approximately conform to the contour of said panel over which it is adapted to lie, spring means associated with said frame member to normally urge said flap into an upright position in front of said windshield, normally stationary means arranged to shift in position responsive to predetermined deceleration of said vehicle, a normally closed latch member operatively connected to said stationary means and retaining said flap portion in close contact with said cap portion, said latch member moving to an unlatched position on shifting of said normally stationary means, whereby said spring means cause said flap portion to pivot into an upright position in front of said windshield.

7. A crash pad adapted to be supported on the instrument panel of a vehicle having a windshield, said pad having a cap portion overlying the top ledge surface of said panel and a depending apron portion overlying and cushioning the front face surface of said panel, a flap portion overlying said cap portion, said flap portion being swingably mounted with respect to said cap portion and adapted upon sudden deceleration of said vehicle to pivot into an upright position in front of said windshield to prevent facial injury to the passengers, said pad comprising a plurality of spaced thickly padded sections extending across said panel, and said flap portion having its free end supported by one of said padded sections.

References Cited in the file of this patent

UNITED STATES PATENTS

| | | |
|---|---|---|
| 1,936,251 | McCullough | Nov. 21, 1933 |
| 2,560,009 | Straith | July 10, 1951 |
| 2,626,163 | Scantlebury | Jan. 20, 1953 |

FOREIGN PATENTS

| | | |
|---|---|---|
| 870,071 | Germany | Mar. 9, 1953 |